(12) United States Patent
Sawai

(10) Patent No.: US 7,154,744 B2
(45) Date of Patent: Dec. 26, 2006

(54) FOLDING TYPE PORTABLE INFORMATION APPLIANCE

(75) Inventor: Toshikazu Sawai, Akiruno (JP)

(73) Assignee: Casio Computer Co., Ltd., Tokyo (JP)

( * ) Notice: Subject to any disclaimer, the term of this patent is extended or adjusted under 35 U.S.C. 154(b) by 257 days.

(21) Appl. No.: 10/745,053

(22) Filed: Dec. 22, 2003

(65) Prior Publication Data

US 2004/0137958 A1    Jul. 15, 2004

(30) Foreign Application Priority Data

Dec. 27, 2002    (JP)    ............................. 2002-382021

(51) Int. Cl.
*G06F 1/16*    (2006.01)
(52) U.S. Cl. ..................... 361/681; 361/679
(58) Field of Classification Search ................ 361/681, 361/679, 683; 348/14.02, 14.03; 455/575.3; 379/428.01
See application file for complete search history.

(56) References Cited

U.S. PATENT DOCUMENTS 5,491,507 A * 2/1996 Umezawa et al. ....... 348/14.02
6,879,337 B1 * 4/2005 Tatehana et al. ........ 348/14.02
2003/0064685 A1 * 4/2003 Kim ............................. 455/90
2004/0023684 A1 * 2/2004 Sato et al. ................ 455/550.1
2004/0051779 A1   3/2004 Tatehana et al.

FOREIGN PATENT DOCUMENTS

| JP | 2000-253124 A | 9/2000 |
| KR | 2000-0076732 A | 12/2000 |
| KR | 2002-0094587 A | 12/2002 |
| KR | 2004-0009314 A | 1/2004 |
| WO | WO 02/100077 A1 | 12/2002 |

* cited by examiner

Primary Examiner—Yean-Hsi Chang
(74) Attorney, Agent, or Firm—Frishauf, Holtz, Goodman & Chick, P.C.

(57) ABSTRACT

A portable information appliance includes a first case having a display, a second case and a hinge coupling the cases together so the cases are foldable relative to each other. The second case covers the display of the first case in the folded condition. The hinge has a pivotally-rotating unit which contains at least one electronic component. When the cases are in an opened position, the pivotally-rotating unit moves from an initial position in which the electronic component faces a direction that is either the same as or opposite to a direction along which the display faces, to a position at which the electronic component faces along an opposite direction than when the pivotally-rotating unit is returned to the initial position when the cases are folded. Opening of the cases does not move the pivotally-rotating unit from the initial position.

3 Claims, 8 Drawing Sheets

FOLDING TYPE PORTABLE INFORMATION APPLIANCE

BACKGROUND OF THE INVENTION

The present invention is related to a folding type portable information appliance. More specifically, the present invention is directed to such a folding type portable information appliance that an electronic component, e.g., a camera is mounted on a hinge portion of the appliance.

Very recently, portable type information appliances such as portable telephones, PDAs, and notebook type PCs are equipped with cameras. In these portable type information appliances, image information containing still images and moving pictures, which have been photographed by the cameras, may be reproduced. Also, the image information may be transferred from these portable type information appliances to personal computers and/or other portable telephones.

On the other hand, there are many opportunities that the cameras mounted on such portable type information appliances are used to photograph not only third parties and scenes, but also the own users. Thus, directions of these cameras, or lenses are required to be changed in response to use conditions. That is, in the case that the own users are photographed by the cameras, these cameras are required to be directed to the same side with respect to the displays, since the users perform photographing operations while photographed picture conditions are monitored on the displays, whereas in such a case that still images and/or moving pictures such as third parties and scenes are photographed by the cameras, these cameras are required to be directed to the opposite side with respect to the displays.

Under such a circumstance, for instance, such a technique for providing a camera on a hinge portion is known as a portable type telephone capable of freely changing a direction of the camera (patent publication 1). The hinge portion couples a first terminal main body having a display to a second terminal main body on which operation buttons are provided in such a manner that both the first terminal main body and the second terminal main body are foldable. Then, in this technique, the user directly and pivotally rotates the pivotally-rotating shaft of the hinge portion by his hand under such a condition that the first terminal main body and the second terminal main body are opened, so that the camera may be directed to a desirable direction. Japanese Laid-open Patent Application No. 2000-253124

In the portable type telephone disclosed in the above-explained patent publication 1, when the camera is used, the pivotally-rotating shaft is manually and pivotally rotated in order that the camera can be directed to the desirable direction. However, after the camera has been used, the pivotally-rotating shaft must be pivotally rotated by the hand of the user in any time in order to return the present camera direction to the original camera direction before the camera operation, which necessarily requires cumbersome operations.

Such a problem may also occur in the below-mentioned cases. That is, for instance, in a portable type telephone, or the like, in which a camera is provided on the side of a rear surface of a first terminal main body having a display, such a single microphone is provided with a hinge portion in order that the single microphone is switched to be operable as a sound collecting microphone during a photographing operation of a moving picture and as a microphone for telephone communications, or this single microphone is switched to be operable as a sound collecting microphone during a photographing operation of a moving picture and as a microphone for entering narration. Also, this problem may occur in a portable type telephone, or the like which is equipped with a music/voice reproducing function, or a game function, a single speaker is provided with a hinge portion in order that this single speaker is switched so as to be operable as a speaker for notifying a telephone call and as a speaker for reproducing voice when a moving picture is reproduced and for outputting effect sound of a game.

In other words, the microphone provided with the hinge portion is directed to the same side with respect to the camera while this microphone is used as the sound collecting microphone when the moving picture is photographed. In the case that this microphone is used as the microphone for telephone communications, when the photographing operation is accomplished, the direction of this microphone must be directed to the same side with respect to the display. Also, while a telephone communication-purpose microphone is separately employed, even if the above-described microphone is used as either the sound collecting microphone or the narration entering microphone, the microphones must be returned to the normal conditions (initial conditions) when the photographing operation is accomplished, assuming now that any one of the above-explained two camera directions is defined as the normal condition, in order to avoid such a case. That is, when a subsequent photographing operation is carried out, this photographing operation is performed under such a condition that the microphone is still directed to the unwanted microphone direction.

On the other hand, the speaker provided with the hinge portion is directed to the same side with respect to the display when this speaker is used as the speaker for reproducing the voice and the effect sound. However, in such a case that this speaker is used as the speaker for notifying the telephone call, when the reproducing operation of the moving picture is accomplished and the game is over, this speaker must be directed to the outer surface side of the case in order that the user can hear the telephone call sound even if the cases are folded.

SUMMARY OF THE INVENTION

The present invention has been made to solve the above-described problem, and therefore, has an object to provide a user-friendly folding type portable information appliance capable of properly directing an electronic component (camera, microphone, speaker etc.) to a desirable direction thereof in response to a use condition, and further, capable of returning the electronic component to an initial condition in conjunction with a folding operation of appliance cases even when a user forgets to return the direction of the electronic component to the initial condition.

To solve the above-described problem, a folding type portable information appliance, according to Claim 1 of the invention, is featured by such a folding type portable information appliance comprising: a first case having a display unit; a second case provided in such a manner that the display unit is covered by the second case; and a hinge portion for coupling the first case to the second case in such a manner that both the first case and the second case are foldable; in which:

the hinge portion is provided with a pivotally-rotating unit containing an electronic component, the pivotally-rotating unit being pivotally rotated between an initial position where the electronic component is directed to any one of the same side and the opposite side with respective to the display unit, and a pivotally-rotating position located opposite to the initial position under such a condition that the first case and the second case are opened; and the pivotally-rotating unit being returned to the initial position in conjunction with folding operation of the first case and the second case.

In accordance with the invention of Claim 1, since the pivotally-rotating unit which contains the electronic component and is pivotally rotated between the initial position and the pivotally-rotating position under such a condition that both the first case and the second case are opened is provided with the hinge portion, the electronic component can be properly arranged on either the same side or the opposite side with respect to the display unit by pivotally rotating the pivotally-rotating unit between the initial position and the pivotally-rotating position in response to the use condition. As a consequence, for example, in the case that the electronic component corresponds to a camera, since the position of this camera is changed, a user himself, a scene, and a third party may be freely photographed by using a single camera. Also, in such a case that the electronic component corresponds to a microphone, such a single microphone may be selectively operated as a telephone communication-purpose microphone, and a sound collecting microphone during a photographing operation, or a sound collecting microphone during a photographing operation, and a narration-entering microphone. Furthermore, in the case that the electronic component corresponds to a speaker, such a single speaker may be selectively operated as a speaker for notifying a telephone call, and a speaker for reproducing voice superimposed with a moving picture/still image, or for reproducing effect sound of a game.

Also, since the pivotally-rotating unit is returned to the initial position in conjunction with the folding operation of the first case and the second case, in such a case that the pivotally-rotating unit is arranged at the pivotally-rotating position under open condition, even if this pivotally-rotating unit is not returned to the initial position at any time, this pivotally-rotating unit may be automatically returned to the initial position in conjunction with the folding operation. As a result, use operability of the folding type portable information appliance can be improved.

The invention recited in Claim 2 is featured by that in the folding type portable information appliance recited in Claim 1, the electronic component is a camera and/or a microphone, and is directed to the same side with respect to the display unit at the initial position.

In accordance with the invention of Claim 2, under such a condition that the first case and the second case are opened, either the camera or the microphone is direct to the same side with respect to the display unit, namely, directed to the user side. As a consequence, in the case that the electronic component corresponds to the camera, just after both the first case and the second case are opened, the user himself can be photographed by the camera. Also, in the case that the electronic component corresponds to the microphone, even when a telephone calling operation is carried out just after the first case and the second case are opened, voice of the user can be firmly collected by the microphone.

Also, under the above-described open condition, since the pivotally-rotating unit is pivotally rotated to the pivotally-rotating position, either the camera or the microphone can be directed to the opposite side with respect to the display unit. As a consequence, either a third party or a scene can be photographed by the camera, and the voice can be collected by the microphone with attendant feelings.

The invention recited in Claim 3 is featured by that in the folding type portable information appliance recited in Claim 1, the electronic component is a speaker, and is directed to the opposite side with respect to the display unit at the initial position.

In accordance with the invention of Claim 3, under such a condition that the first case and the second case are folded, the speaker is directed to the opposite side with respect to the display unit. As a consequence, even in such a case that after the user views an image, this user forgets to return the pivotally-rotating unit from the pivotally-rotating position to the initial position, the pivotally-rotating unit may be automatically returned to the initial position in conjunction with the folding operation, and the speaker is directed to the opposite side with respect to the display unit. As a result, even when a telephone call is received, sound volume is not lowered, but this telephone call can be notified at the regular calling sound volume.

Also, under the open condition, since the pivotally-rotating unit is pivotally rotated to the pivotally-rotating position, the speaker can be directed to the same side with respect to the display unit. As a result, there is small loss occurred until voice which has been superimposed with a moving picture, a still image, and the like, and further effective sound of a game can be reached to ears of the user, so that the user can enjoy powerful voice and forceful sound.

BRIEF DESCRIPTION OF THE DRAWINGS

FIGS. 3A to 3C are side sectional views for explaining operations of the folding type portable information appliance.

FIGS. 7A to 7C are side sectional views for explaining operations of the folding type portable information appliance of the second embodiment.

DETAILED DESCRIPTION OF PREFERRED EMBODIMENTS

Referring now to drawings, first and second embodiments of the present invention will be described by exemplifying a portable telephone.

First Embodiment

Figure 1:
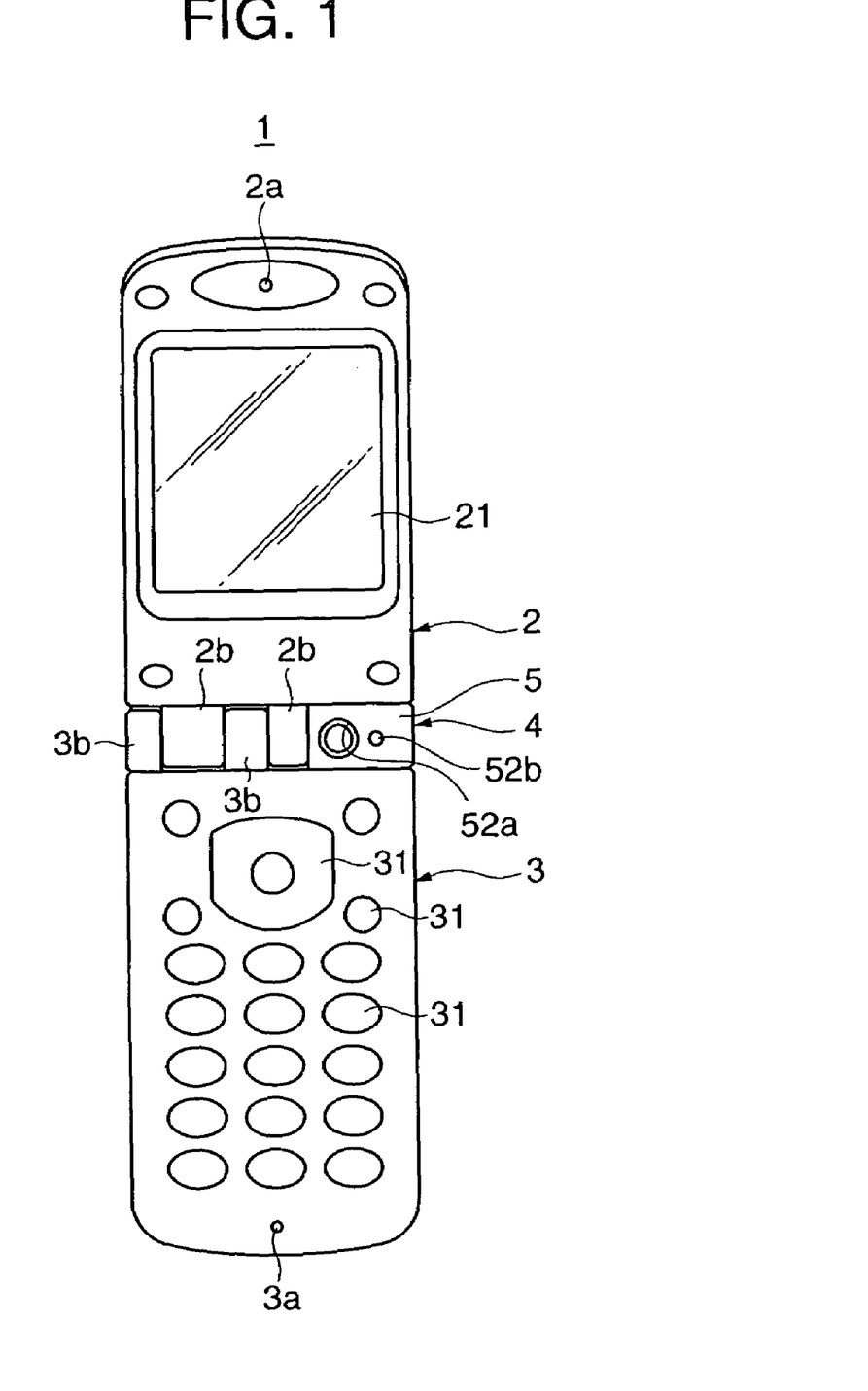
FIG. 1 is an upper view of a folding type portable information appliance for indicating an open condition of both a first case and a second case used to represent a first embodiment of the present invention.
Figure 2:
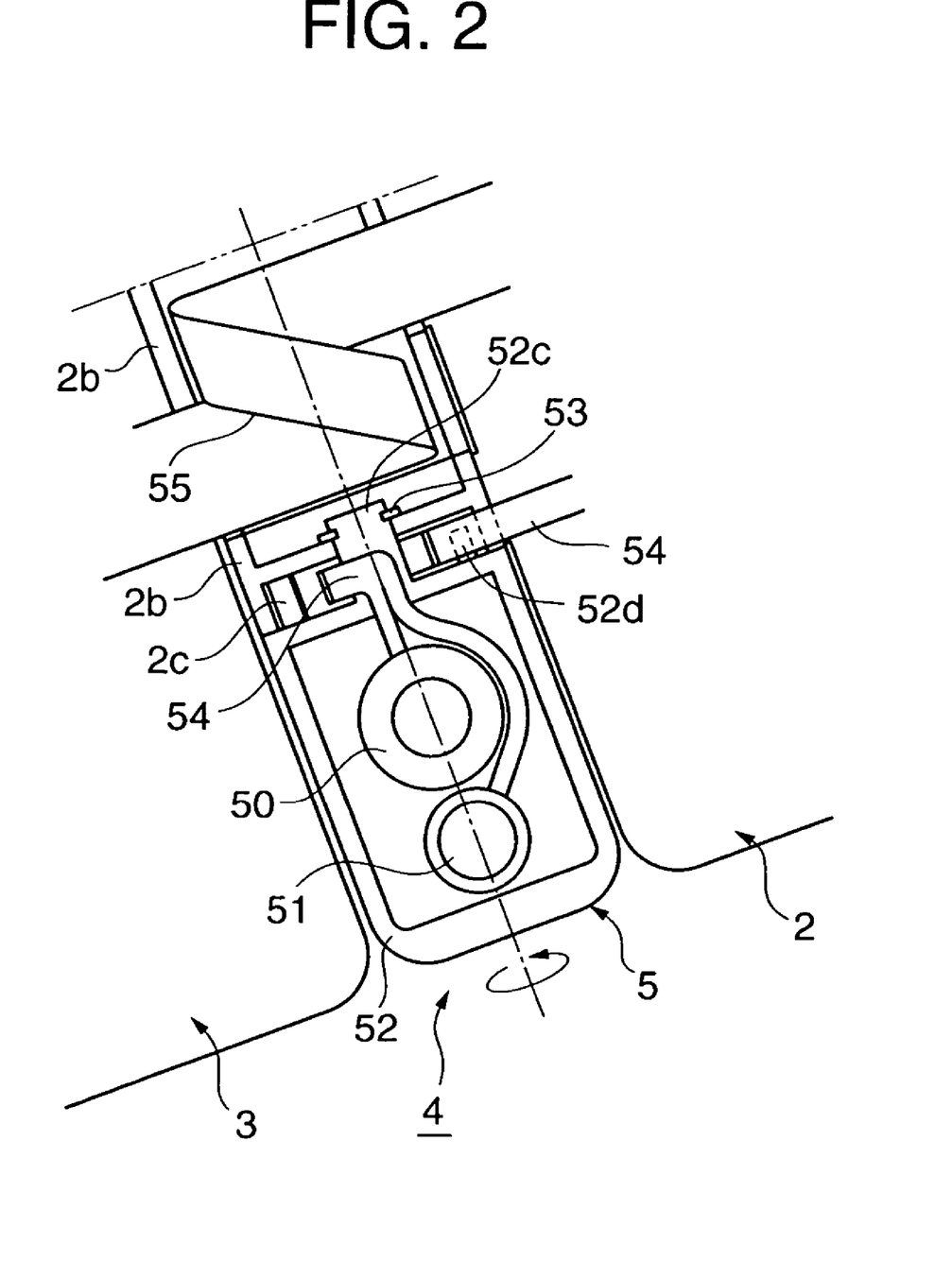
FIG. 2 is an upper sectional view of a pivotally-rotating unit of the first embodiment.
Figure 3A:
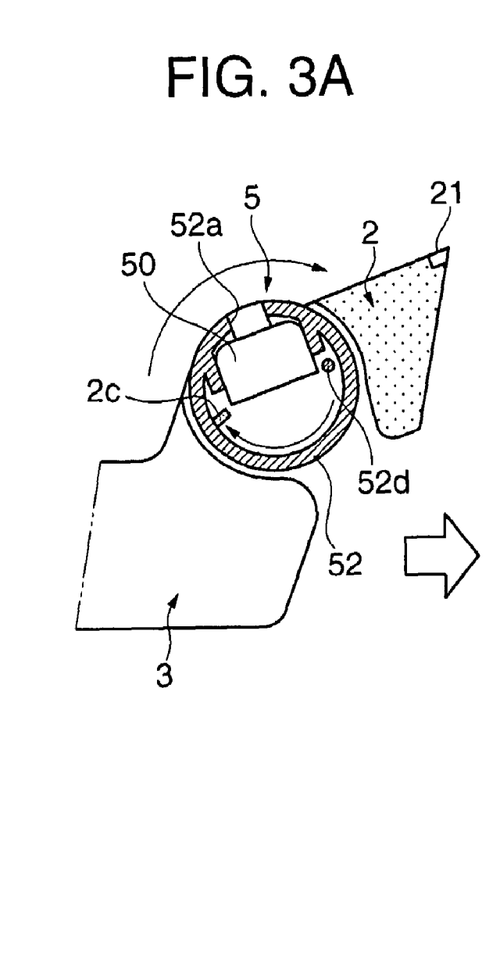
FIG. 3A indicates the open condition of both the first case and the second case.
Figure 3B:
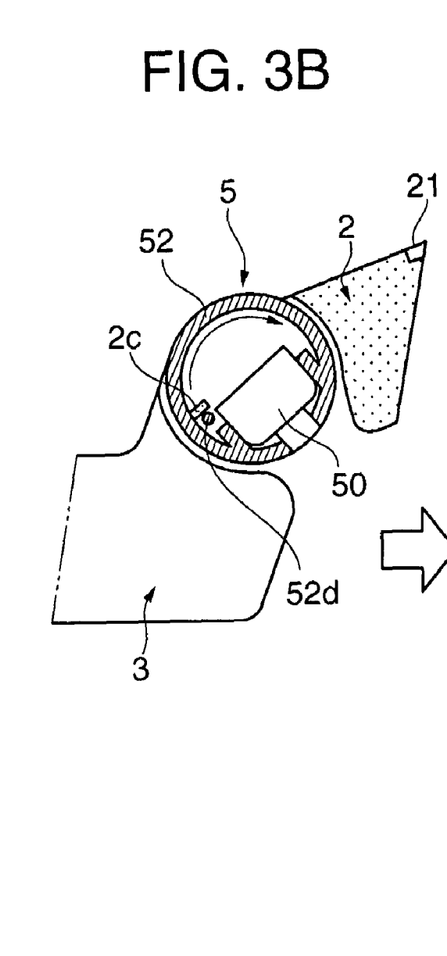
FIG. 3B represents a condition that the pivotally-rotating unit is pivotally rotated.
Figure 3C:
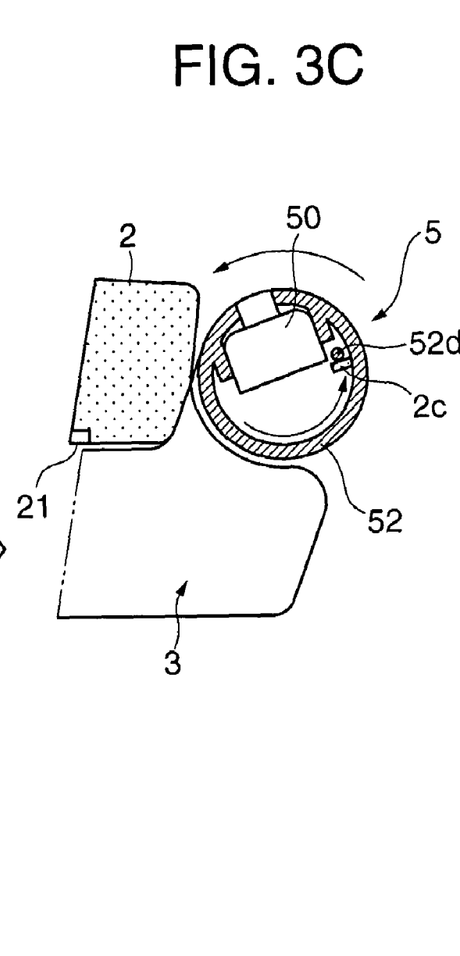
FIG. 3C shows a condition that the first case and the second case are folded.

FIG. 1 is an upper view of a folding type portable information appliance (portable telephone) according to a first embodiment of the present invention, which indicates open conditions of a first case and a second case. FIG. 2 is an upper sectional view of a pivotally-rotating unit. FIGS. 3A to 3C are side sectional views for explaining operations of the folding type portable information appliance; FIG. 3A indicates the open condition of both the first case and the second case; FIG. 3B represents a condition that the pivotally-rotating unit is pivotally rotated; FIG. 3C shows a condition that the first case and the second case are folded.

First, a description is made of a construction of the folding type portable information appliance of the first embodiment.

As indicated in FIG. 1, the folding type portable information appliance (portable telephone) 1 is equipped with a first case 2, a second case 3, and a hinge portion 4. The hinge portion 4 couples the first case 2 to the second case 3 in such a manner that the first case 2 and the second case 3 can be folded.

Both a display unit 21 capable of displaying thereon an image and a speaker hole 2a for telephone communications are provided on an inner plane of the first case 2. Also, although not shown in the drawing, an antenna, a display driver, a speaker for telephone communications, and the like are provided within the first case 2.

Various sorts of operation buttons 31 and a microphone hole 3a for telephone communications are provided on an inner plane of the second case 3. Although not shown in the drawing, a CPU, a battery, a microphone for telephone communications, and the like are provided within the second case 3.

The hinge portion 4 is constructed by employing both a pivotally-rotating shaft 2b provided on the first case 2 and a pivotally-rotating shaft supporting portion 3b provided on the second case 3. Since the pivotally-rotating shaft 2b and the pivotally-rotating shaft supporting portion 3b are mutually coupled to each other, both the first case 2 and the second case 3 can be opened/closed in such a manner that the respective inner planes thereof are located opposite to each other.

Also, as shown in FIG. 1 and FIG. 2, a pivotally-rotating unit 5 is provided with the hinge portion 4. The pivotally-rotating unit 5 contains a camera 50 and a microphone 51. The pivotally-rotating unit 5 is pivotally rotated between an initial position and a pivotally-rotating position, and is returned to the initial position in conjunction with the folding operation of the first case 2 and the second case 3 (in FIG. 2, pivotally-rotating unit 5 is pivotally rotated along arrow direction). At the initial position, both the camera 50 (camera hole 52a) and the microphone 51 (microphone hole 52b) are directed to the same side with respect to the display unit 21 under such a condition that the first case 2 and the second case 3 are opened. At the pivotally-rotating position, both the camera 50 and the microphone 51 are directed to an opposite side (namely, rear surface side of first case 2) with respect to the initial position.

Now, the construction of the pivotally-rotating unit 5 will be explained in detail.

As indicated in FIG. 2, the pivotally-rotating unit 5 is roughly arranged with employment of the camera 50, the microphone 51, a unit case 52, an "E" ring 53, and an FPC (flexible wiring member) 54, and the like. It should be noted that reference numeral 55 shown in FIG. 2 indicates an FPC which connects a circuit employed in the first case 2 to a circuit employed in the second case 3.

While both the camera 50 and the microphone 51 are stored in the unit case 52, a center shaft 52c of the unit case 52 is engaged with respect to the first case 2 in such a manner that this center shaft 52c can be pivotally rotated with respect to the first case 2, and is supported by the "E" ring 53 in such a manner that this center shaft 52c is not extracted. Then, the unit case 52 is pivotally rotated by a finger of a user between the above-described initial position and pivotally-rotating position while the center shaft 52c thereof is located as a center. Further, the unit case 52 is constituted in such a manner that this unit case 52 is returned to the initial position in conjunction with the folding operation of the first case 2 and the second case 3.

In other words, a convex portion 52d is formed on a side plane of the unit case 52, and is projected from this side plane. On the other hand, another convex portion 2c is formed also on the side plane of the first case 2 (precisely speaking, side plane of pivotally-rotating shaft 2b provided on first case 2) in such a manner that the concave portion 2c is projected from this side plane and functions as a pivotally-rotating stopper of the unit case 52. Then, as will be discussed later, under the open condition of FIG. 3A, when the unit case 52 is pivotally rotated by a hand of the user from the initial position to the pivotally-rotating position, the convex portion 52d of the unit case 52 abuts against the convex portion 2c of the first case 2, so that this pivotal rotation of the unit case 52 is stopped (see FIG. 3B). Also, when the first case 2 is folded with respect to the second case 3 from the open condition of FIG. 3B, the convex portion 2c of the first case 2 pushes the convex portion 52d of the unit case 52 in conjunction with this folding operation, and then this pivotal rotation is stopped under such a condition that both the first case 2 and the second case 3 have been folded (see FIG. 3C).

It should also be noted that the FPC 54 is wound on the center shaft 52c of the unit case 52, one end of the FPC 54 is connected to both the camera 50 and the microphone 51, the other end of the FPC 54 is conducted into the first case 2, and this FPC 54 is connected to a circuit (not shown). Even when the unit case 52 is pivotally rotated by the finger, since the FEC 54 merely causes only gentle changes, a large stress never occurs on the FPC 54 and the wires of the FEC 54 are not disconnected. As to the gentle changes, even if the unit case 52 is pivotally rotated, the FFC 54 is loosed with respect to the center shaft 52c of the unit case 52 (namely, winding diameter becomes large), or the FPC 54 is fastened with respect to the center shaft 52c of the unit case 52 (namely, winding diameter is decreased).

Next, operations of the folding type portable information appliance 1 will be explained based upon FIGS. 3A to 3C.

FIG. 3A is a diagram for indicating the open condition of the first case 2 and the second case 3. Under this open condition, the pivotally-rotating unit 5 is arranged at the initial position where both the camera 50 (camera hole 52a) and the microphone 51 (microphone hole 52b) which is not shown in the drawing, are directed to the same side with respect to the display unit 21, and both the convex portion 2c of the first case 2 and the convex portion 52d of, the unit case 52 are brought into a separate condition.

Under this open condition, since the pivotally-rotating unit 5 is freely and pivotally rotated, when the pivotally-rotating unit 5 arranged at the initial position is pivotally rotated along a clockwise direction, the convex portion 52d of the unit case 52 abuts against the convex portion 2c of the first case 2. As a result, the pivotal rotation of the pivotally-rotating unit 5 is stopped and the pivotally-rotating unit 5 is arranged at the pivotally-rotating position, and both the camera 50 (camera hole 52*a*) and the microphone 51 (microphone hole 52*b*) are directed to the opposite side with respect to the display unit 21 (see FIG. 3B).

When the first case 2 and the second case 3 are folded from such a condition that the pivotally-rotating unit 5 has been arranged at the pivotally-rotating position as explained above, the convex portion 2*c* of the first case 2 is pivotally rotated along a counterclockwise direction in conjunction with this folding operation, and at the same time, this convex portion 2*c* pushes the convex portion 52*d* of the unit case 52, so that the convex portion 52*d* of the unit case 52 is similarly pivotally rotated along the counterclockwise direction and then stops. Then, both the camera 50 (camera hole 52*a*) and the microphone 51 (microphone hole 52*b*) are directed to the same side with respect to the display unit 21 (see FIG. 3C).

Also, when the first case 2 is opened with respect to the second case 3 from such a condition that both the first case 2 and the second case 3 have been folded, the convex portion 2*c* of the first case 2 which has abutted against the convex portion 52*d* of the unit case 52 is pivotally rotated along the clockwise direction, and then, both the convex portion 52*d* of the unit case 52 and the convex portion 2*c* of the first case 2 stop under such a condition that the convex portion 52*d* is separated from the convex portion 2*c* (refer to FIG. 3A). At this time, since the convex portion 2*c* of the first case 2 is pivotally rotated along the clockwise direction, this convex portion 2*c* of the first case 2 does not push the convex portion 52*d* of the unit case 52, but also, while the pivotally-rotating unit 5 is not pivotally rotated, both the camera 50 (camera hole 52*a*) and the microphone 51 (microphone hole 52*b*) are maintained to be directed to the same side.

As previously explained, in accordance with the folding type portable information apparatus 1 of the first embodiment of the present invention, under such a condition that the first case 2 and the second case 3 are opened, both the camera 50 (camera hole 52*a*) and the microphone 51 (microphone hole 52*b*) are directed to the same side with respect to the display unit 21, namely, directed to the user side. As a result, immediately after both the first case 2 and the second case 3 are opened, the user himself can be photographed by the folding type portable information appliance 1, and comments made of voice may be given to photographed images.

Also, under the open condition, since the pivotally-rotating unit 5 is pivotally rotated to the pivotally-rotating position, both the camera 50 (camera hole 52*a*) and the microphone 51 (microphone hole 52*b*) can be directed to the opposite side with respect to the display unit 21. As a result, voice can be collected having attendant feelings during photographing operation.

Furthermore, since the pivotally-rotating unit 5 is returned to the initial position in conjunction with the folding operation of the first case 2 and the second case 3, the pivotally-rotating unit 5 is arranged at the pivotally-rotating position under the open condition. In such a case that both the camera 50 (camera hole 52*a*) and the microphone 51 (microphone hole 52*b*) are directed to the opposite side with respect to the display unit 21, even if the pivotally-rotating unit 5 is not manually and pivotally rotated so as to be returned to the initial position at any time, then the pivotally-rotating unit 5 may be automatically returned to the initial position in conjunction with the folding operation, and thus, both the camera 50 (camera hole 52*a*) and the microphone 51 (microphone hole 52*b*) are also directed to the same side with respect to the display unit 21. As a consequence, the returning operation to the initial position can be simplified, and thus, use operability of the folding type portable information appliance 1 can be improved.

It should also be noted that in the above-described first embodiment, the microphone 51 may be alternatively used not only as a microphone capable of collecting sound during photographing operation, but also as a microphone for telephone communications. With employment of this alternative structure, since the microphone for telephone communications provided within the second case 3 is no longer required, a total number of structural components may be decreased, and the portable information appliance 1 may be used as a television telephone.

Also, in the first embodiment, the portable information appliance 1 is arranged in such a manner that both the camera 50 and the microphone 51 are stored in the unit case 52. Alternatively, any one of the camera 50 and the microphone 51 may be stored in the unit case 52. For instance, in the case that only a camera is stored in the unit case 52, a microphone for collecting sound may be preferably provided on the side of the rear surface of either the first case 2 or the second case 3. In the case that only a microphone is stored in the unit case 52, since the unit case 52 is pivotally rotated, this microphone may be switched as a microphone for collecting sound, or as a microphone used to enter narration while photographing operation is carried out. It should also be understood that when only the camera is stored in the unit case 52, the microphone for telephone communications employed within the second case 3 may be used as a microphone for entering narration during photographing operation.

Also, in the above-described first embodiment, the electronic component which is stored in the unit case 52 in combination with the camera 50 corresponds to the microphone 51. Alternatively, the unit case 52 may, be constituted in such a manner that a compact light emitting member constructed of a white-light LED, or the like may be stored in this unit case 52 as an illuminating light used while photographing operation is performed. In other words, both the camera 50 and such a compact light emitting member may be alternatively stored in the unit case 52. Otherwise, the camera 50, the microphone 51, and the compact light emitting member may be alternatively stored in the unit case 52. Since such alternative structures of the unit case 52 are employed, even when photographing needs are made in-the nighttime, clear images may be acquired.

Second Embodiment

Figure 4:
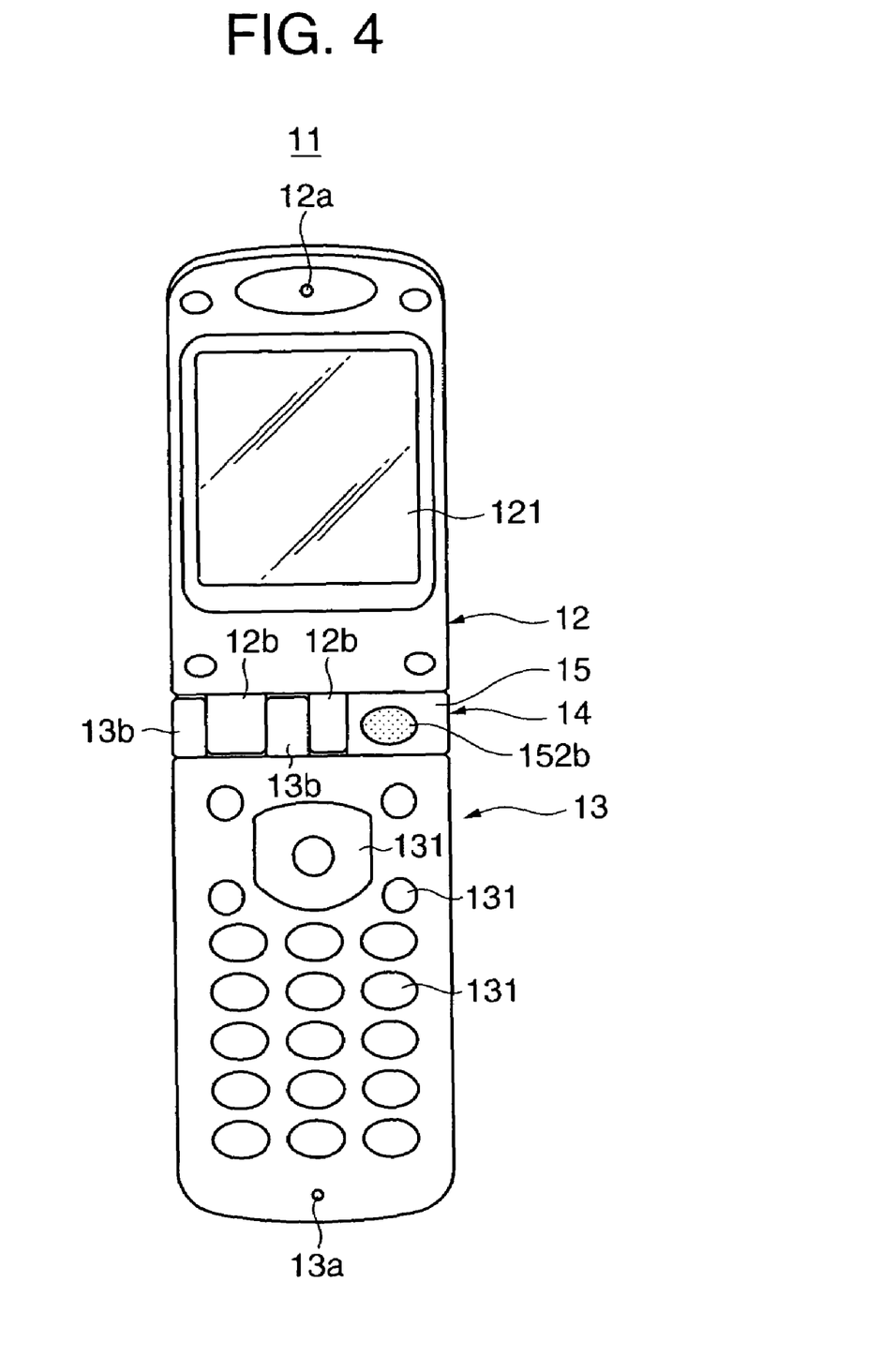
FIG. 4 is an upper view of a folding type portable information appliance for indicating an open condition of both a first case and a second case used to represent a second embodiment of the present invention.
Figure 5:
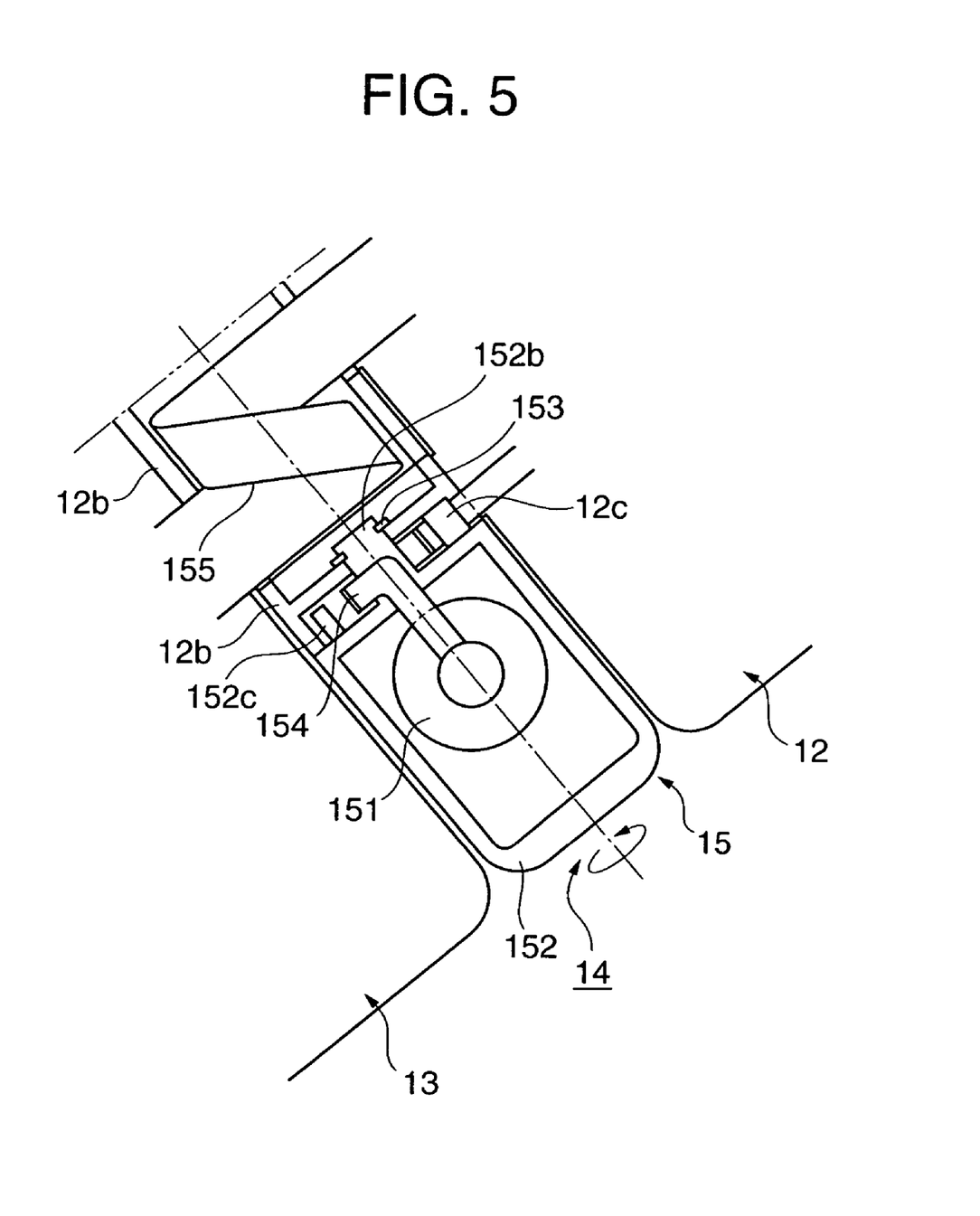
FIG. 5 is an upper sectional view of a pivotally-rotating unit of the second embodiment just after the appliance case is opened.
Figure 6:
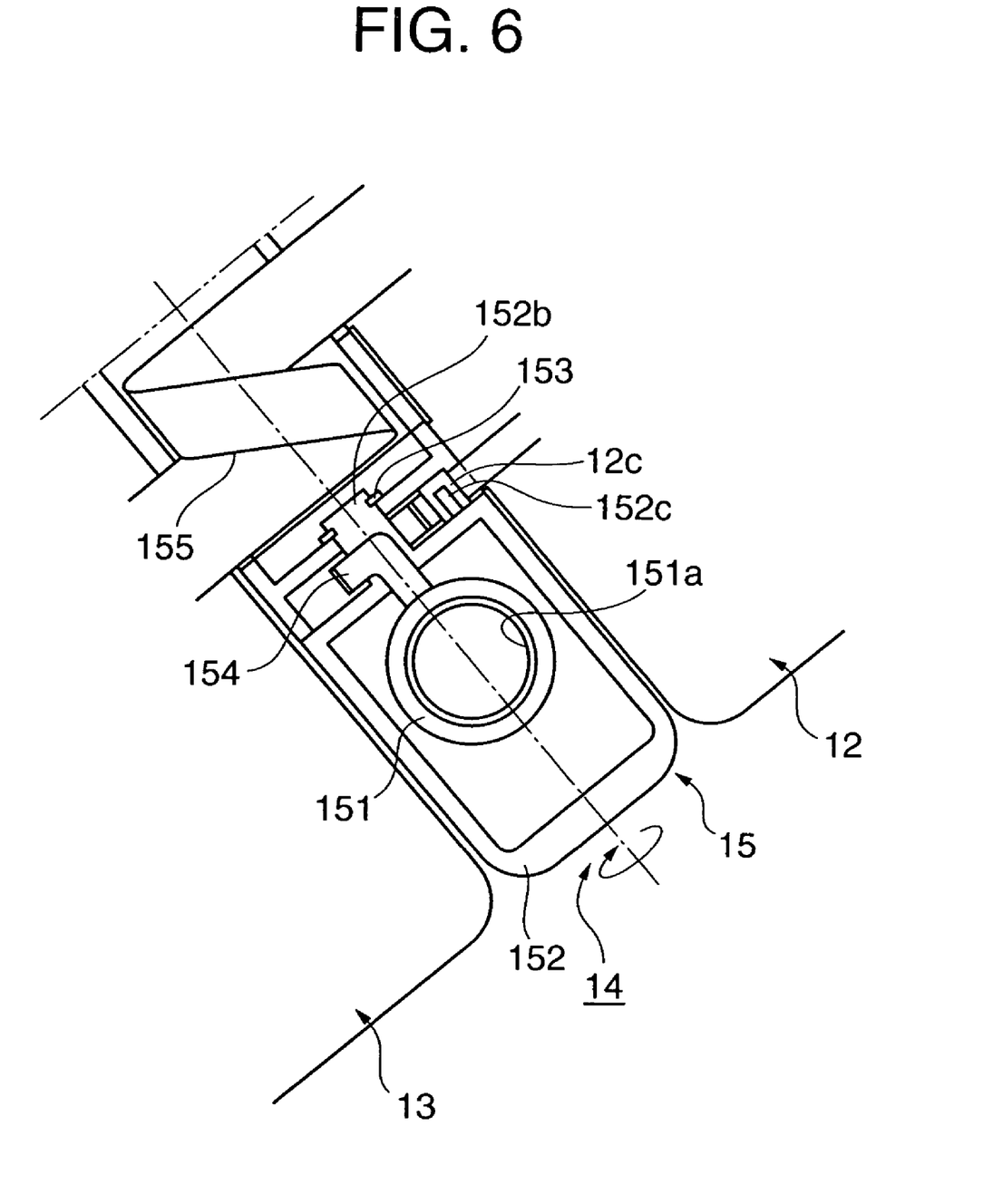
FIG. 6 is an upper sectional view of the pivotally-rotating unit of the second embodiment after the pivotally-rotating unit has been pivotally rotated under such a condition that the appliance case is opened.
Figure 7A:
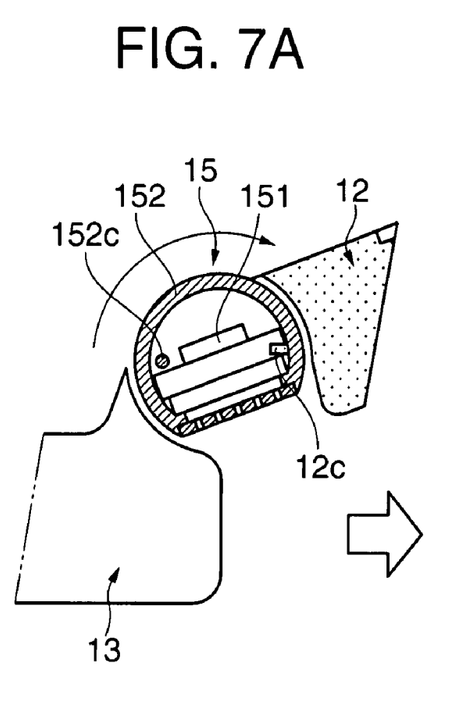
FIG. 7A indicates the open condition of both the first case and the second case.
Figure 7B:
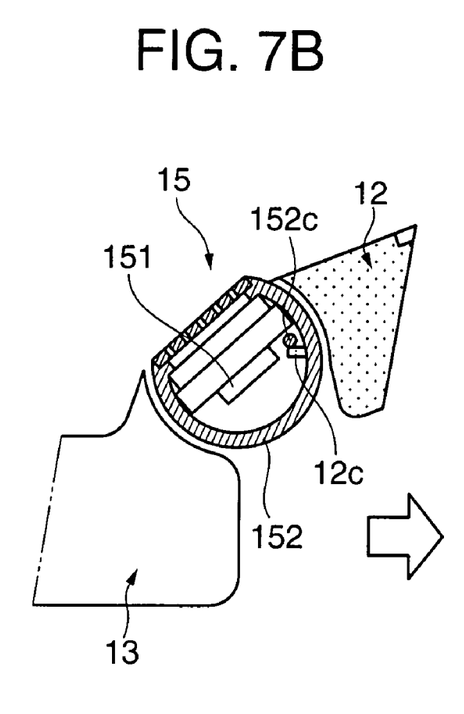
FIG. 7B represents a condition that the pivotally-rotating unit is pivotally rotated.
Figure 7C:
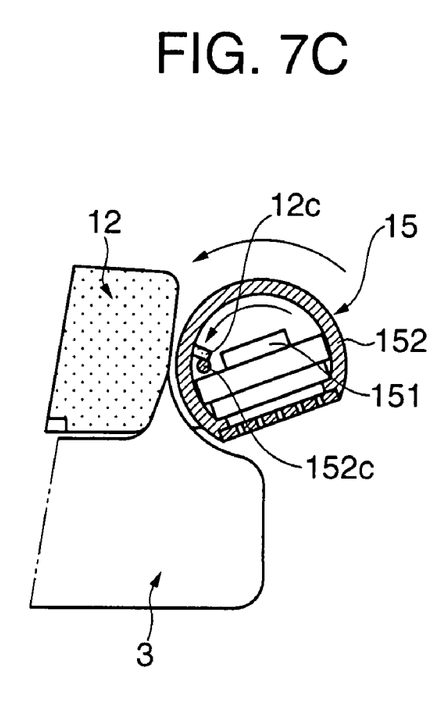
FIG. 7C shows a condition that the first case and the second case are folded.

FIG. 4 is an upper view of a folding type portable information appliance (portable telephone) according to a second embodiment of the present invention, which indicates open conditions of a first case and a second case. FIG. 5 is an upper sectional view of a pivotally-rotating unit just after the cases of the folding type portable information appliance are opened. FIG. 6 is an upper sectional view of the pivotally-rotating unit after this pivotally-rotating unit is pivotally rotated under such a condition that the cases of the folding type portable information appliance are opened. FIGS. 7A to 7C are side sectional views for explaining operations of the folding type portable information appliance, FIG. 7A indicates the open condition of both the first case and the second case; FIG. 7B represents a condition that the pivotally-rotating unit is pivotally rotated; FIG. 7C shows a condition that the first case and the second case are folded.

It should be noted that in the folding type portable information appliance 11 of the second embodiment, an electronic component contained in the pivotally-rotating unit 15 corresponds to a speaker 151. The speaker 151 is directed to an opposite side with respect to a display unit 121 of at an initial position, and is directed to the same side with respect to the display unit 121 at a pivotally-rotating position. Since other constructions and operations of the folding type portable information appliance 11 are similar to those of the first embodiment, descriptions thereof are omitted. Only different structures and different operations are explained.

As represented in FIG. 4, the folding type portable information appliance 11 is equipped with a first case 12, a second case 13, and a hinge portion 14. The first case 12 owns the display unit 121, and a speaker hole 12a for telephone communications. The second case 13 owns various sorts of operation buttons 131 and a microphone hole 13a for telephone communications. The hinge portion 14 couples the first case 12 to the second case 13 in such a manner that these first and second cases 12 and 13 can be folded.

Also, as shown in FIG. 5 and FIG. 6, the pivotally-rotating unit 15 is provided with the hinge portion 14. The pivotally-rotating unit 15 contains the speaker 151. The pivotally-rotating unit 15 is pivotally rotated between an initial position (see FIG. 5 and FIG. 7A which will be explained later) and a pivotally-rotating position (see FIG. 4, FIG. 6, and FIG. 7B which will be explained later), and is returned to the initial position in conjunction with the folding operation of the first case 12 and the second case 13 (in FIG. 5, pivotally-rotating unit 15 is pivotally rotated along arrow direction). At the initial position, the speaker 151 (sound hole 152a of speaker 151) is directed to the opposite side with respect to the display unit 121 under such a condition that the first case 12 and the second case 13 are opened. At the pivotally-rotating position, the speaker 151 is directed to the same side with respect to the display unit 121.

As indicated in FIG. 5, the pivotally-rotating unit 15 is roughly arranged with employment of the speaker 151, a unit case 152, an "E" ring 153, and an FPC 154, and the like. It should be noted that reference numeral 152c shown in FIG. 5 indicates a convex portion which is projected from a side plane of the unit case 152, reference numeral 12c indicates a convex portion which is projected from a side plane (precisely speaking, side plane of pivotally-rotating shaft 12b provided in first case 12) of the first case 12, and reference numeral 155 shows an FPC which connects a circuit employed in the first case 12 to a circuit employed in the second case 13. Then, the unit case 152 is pivotally rotated by a finger of a user between the above-described initial position and pivotally-rotating position while the center shaft 152b thereof is located as a center. Further, the unit case 152 is constituted in such a manner that this unit case 152 is returned to the initial position in conjunction with the folding operation of the first case 12 and the second case 13. It should also be noted that both the convex portion 152c and the convex portion 12c in the second embodiment correspond to both the convex portion 52d and the convex portion 2c in the first embodiment shown in FIG. 2, respectively, but the arranging positions of these convex portion 152c and 12c are located opposite-to those of the first embodiment.

As a consequence, under open conditions of FIG. 5 and FIG. 7A, when the unit case 152 is pivotally rotated by a hand of the user from the initial position to the pivotally-rotating position, the convex portion 152c formed on the unit case 152 abuts against the convex portion 12c formed on the first case 12, so that this pivotal rotation of the unit case 152 is stopped (see FIG. 6 and FIG. 7B). Also, when the first case 12 is folded with respect to the second case 3 from the open condition of FIG. 7B, the convex portion 2c of the first case 12 pushes the convex portion 152c of the unit case 152 in conjunction with this folding operation, and then this pivotal rotation is stopped under such a condition that both the first case 12 and the second case 13 have been folded (see FIG. 7C).

As previously explained, in accordance with the folding type portable information apparatus 11 of the second embodiment of the present invention, the speaker 151 (speaker hole 152a) is directed to the display unit 121 in conjunction with the pivotal rotation of both the first case 12 and the second case 13. As a consequence, even in such a case that after the user views an image, this user forgets to return the pivotally-rotating unit 51 from the pivotally-rotating position to the initial position, the pivotally-rotating unit 51 may be automatically returned to the initial position in conjunction with the folding operation, and the speaker 151 (speaker hole 152a) is also directed to the opposite side with respect to the display unit 121. As a result, the returning operation to the initial position can be simplified, and thus, use operability of the folding type portable information appliance 11 can be improved. Also, even when a telephone call is received, sound volume is not lowered, but this telephone call can be notified at the regular calling sound volume.

Also, under the open condition, since the pivotally-rotating unit 15 is pivotally rotated to the pivotally-rotating position, the speaker 151 (speaker hole 152a) can be directed to the same side with respect to the display unit 121. As a result, there is small loss occurred until voice which has been superimposed with a moving picture, a still image, and the like, and further effective sound of a game can be reached to ears of the user, so that the user can enjoy powerful voice and forceful sound.

It should also be understood that in the second embodiment, a camera may be alternatively provided on the side of the rear surface of either the first case 12 or the second case 13. Otherwise, a pivotally-rotating unit containing only the camera, or another pivotally-rotating unit containing either a microphone or an illuminating light in combination with the camera may be alternatively added to a hinge portion 14. In this alternative case, while the hinge portion-14 (pivotally-rotating shaft 12b and pivotally-rotating shaft supporting unit 13b) is arranged at a center portion, both the pivotally-rotating unit 15 containing the speaker 151 and the additional pivotally-rotating unit containing the camera are arranged on both sides of this hinge portion 14. In such a case that the above-described pivotally-rotating unit containing the camera is additionally provided with the hinge portion 14, the following arrangement is desirable. That is, while an arranging relationship between a convex portion formed on the additional pivotally-rotating unit and a convex portion of the first case 12 is made equal to that of the first embodiment, the camera is directed to the same side with respect to the display unit 121 at the initial position, whereas the camera is directed to the opposite side with respect to the display unit 121 at the pivotally-rotating position.

Also, in the above-described embodiment, the electronic component corresponds to the speaker 151. Alternatively, this electronic component may correspond to a piezoelectric element, a buzzer, or the like.

Figure 8:
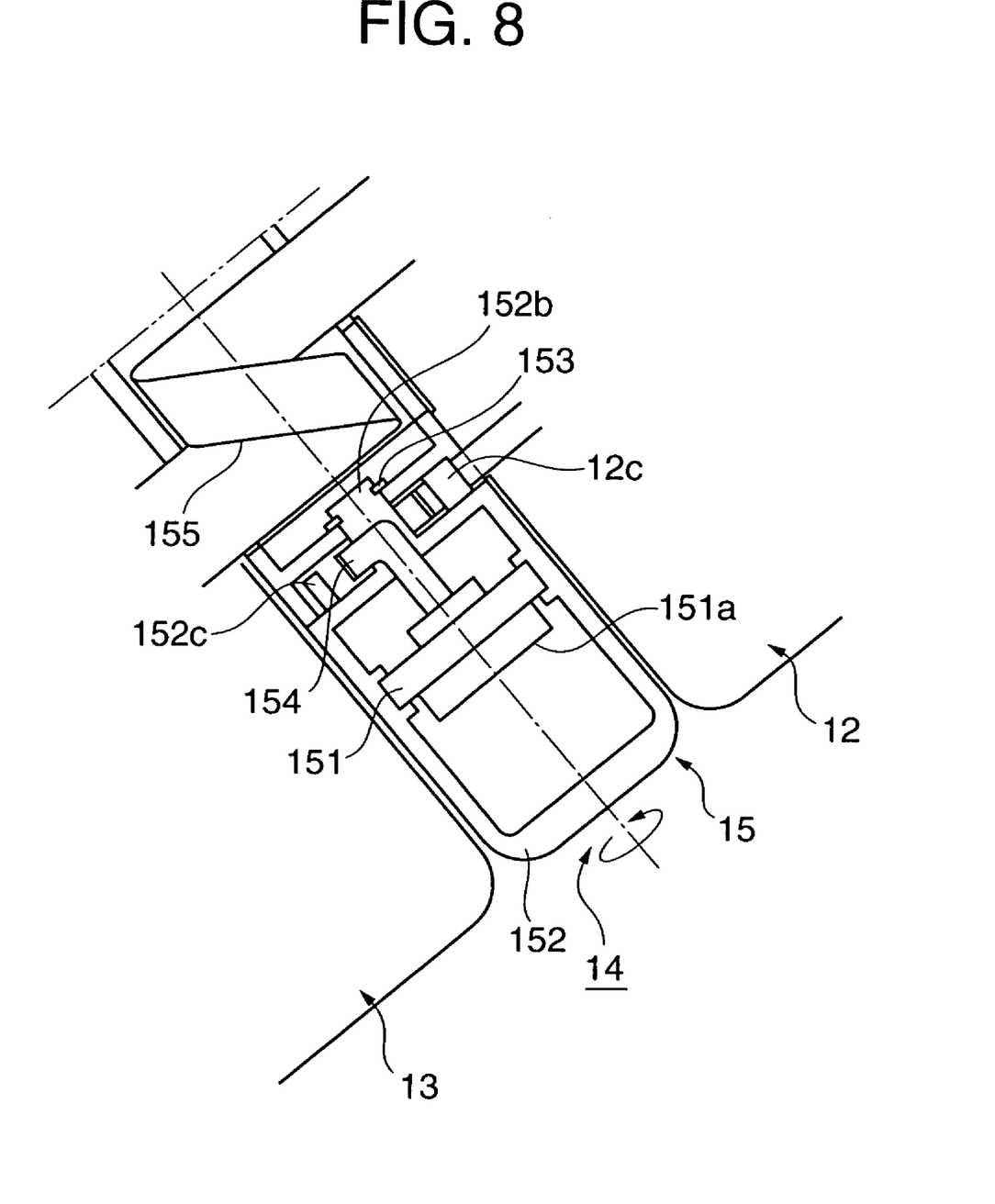
FIG. 8 is a side sectional view of a pivotally-rotating unit for indicating a modification of the second embodiment.

Furthermore, as the speaker 151, such a speaker that the sound hole 151a is formed in the upper plane thereof is used, and the upper plane of this speaker 151 is so arranged as to be directed to the same side, or the opposite side with respect to the display unit 121. Alternatively, as shown in FIG. 8, while the speaker 151 may be stored in such a manner that this speaker 151 is directed along the cylindrical direction of the hinge portion 14, the sound hole 151a of the speaker 151 may be directed along the cylindrical direction of the hinge portion 14. Also, in this alternative case, the speaker hole formed in the unit case 152 may be directed to the opposite side with respect to the display unit 121 under initial condition.

In the first embodiment and the second embodiment, since the convex portions 52d and 152c formed on the unit cases are engaged with the convex portions 2c and 12c formed on the first case, both the pivotally-rotating units 5 and 15 can be freely and pivotally rotated. Alternatively, for instance, such an arrangement may be made. That is, while similar convex portions are formed on the second cases 3 and 13, the convex portions formed on the unit cases may be engaged with the convex portion of the second cases 3 and 13.

In addition, the wiring lines of the camera 50, the microphone 51, and the speaker 151 are realized by the microphone FPC 54, or the speaker FPC 154. The present invention is not limited only to this example. For instance, leadwires, or shieldlines used in a PDA and a personal computer may be alternatively employed.

Also, the "E" rings 53 and 153 are employed as the extract-presenting members for the unit cases 52 and 152. Alternatively, other rings and/or other case shapes may be employed so as to construct that the unit cases 52 and 152 are not extracted by engaging these rings to other cases.

Also, in the above-described second embodiment, the electronic component which is stored in the unit case 152 corresponds to speaker 151. Alternatively, the unit case 152 may be constituted in such a manner that a compact light emitting member may be stored in this unit case 152. For example, in the case that a white light LED is stored as the compact light emitting member, this white-light LED may be used as an illuminating light. Alternatively, in such a case that a red light LED is stored as the compact light emitting member, this red light LED may be used as a pointer in presentation.

In accordance with the invention of Claim 1, since the pivotally-rotating unit which contains the electronic component and is pivotally rotated between the initial position and the pivotally-rotating position under such a condition that both the first case and the second case are opened is provided with the hinge portion, the electronic component can be properly arranged on either the same side or the opposite side with respect to the display unit by pivotally rotating the pivotally-rotating unit between the initial position and the pivotally-rotating position in response to the use condition.

Also, since the pivotally-rotating unit is returned to the initial position in conjunction with the folding operation of the first case and the second case, the returning operation to the initial position can be simplified, and thus, use operability of the folding type portable information appliance can be improved.

In accordance with the invention of Claim 2, it is apparent to achieve a similar effect to that of Claim 1. Further, just after the first case and the second case are opened, the user himself can be photographed by the camera. Also, the telephone communication voice can be collected by the microphone, so that the folding type portable information appliance can be operated in the telephone communication.

Also, since either the camera or the microphone can be directed to the opposite side with respect to the display unit under the open condition, either a third party or a scene can be photographed by the camera, and the voice can be collected by the microphone with attendant feelings.

In accordance with the invention of Claim 3, it is apparent to achieve a similar effect to that of Claim 1. Further, even when the telephone call is received, there is no case that the sound volume becomes lower, but the telephone call can be notified at the regular sound volume of the telephone call.

Also, under the open condition, the speaker can be directed to the same side with respect to the display unit. As a result, the moving picture, the still image, and the like can be reproduced by the speaker in better sound qualities, and the user can enjoy the powerful sound.

What is claimed is:

1. A folding type portable information appliance comprising:
   a first case having a display unit;
   a second case; and
   a hinge portion for coupling the first case to the second case in such a manner that both the first case and the second case are foldable with respect to each other, and such that the second case covers the display unit of the first case when the first and second cases are folded together;
   wherein the hinge portion comprises a pivotally-rotating unit which contains at least one electronic component;
   wherein when the first case and the second case are in an opened position with respect to each other, the pivotally-rotating unit is pivotally rotatable between: (i) an initial position in which the electronic component faces along a direction that is one of the same as and opposite to a direction along which the display unit faces, and (ii) a pivotally-rotated position at which the electronic component faces along an opposite direction than when the pivotally-rotating unit is in the initial position; and
   wherein movement of the pivotally-rotating unit is coupled to folding of the first case and second case such that the pivotally-rotating unit is returned to the initial position from the pivotally-rotated position when the first case and the second case are folded, and movement of the pivotally-rotating unit is not coupled to opening of the first case and the second case such that opening of the first case and the second case does not move the pivotally-rotating unit from the initial position.

2. The folding type portable information appliance as claimed in claim 1, wherein the at least one electronic component comprises at least one of a camera and a microphone, and the at least one electronic component faces along the same direction as the display unit when the pivotally-rotatable unit is in the initial position.

3. The folding type portable information appliance as claimed in claim 1, wherein the at least one electronic component comprises a speaker, and the at least one electronic component faces along the direction that is opposite to the direction along which display unit faces when the pivotally-rotatable unit is in the initial position.

* * * * *